(12) United States Patent
Fujisaki (10) Patent No.: US 11,920,554 B1
(45) Date of Patent: Mar. 5, 2024

(54) BUOYANCY POWER GENERATOR AND BUOYANCY POWER GENERATION METHOD

(71) Applicant: Sanao Fujisaki, Tosu (JP)

(72) Inventor: Sanao Fujisaki, Tosu (JP)

(73) Assignee: Ichiko Fujisaki, Kurume (JP)

(*) Notice: Subject to any disclaimer, the term of this patent is extended or adjusted under 35 U.S.C. 154(b) by 0 days.

(21) Appl. No.: 18/479,826

(22) Filed: Oct. 3, 2023

(30) Foreign Application Priority Data

Oct. 13, 2022 (JP) ................................. 2022-164462

(51) Int. Cl.
*F03B 17/02* (2006.01)

(52) U.S. Cl.
CPC ............ *F03B 17/025* (2013.01); *Y02E 10/20* (2013.01)

(58) Field of Classification Search
CPC ........ F03B 17/00; F03B 17/02; F03B 17/025; Y02E 10/20
See application file for complete search history.

(56) References Cited

U.S. PATENT DOCUMENTS

| | | | | |
|---|---|---|---|---|
| 939,506 | A * | 11/1909 | Hubmann | F03B 17/00 60/503 |
| 1,139,995 | A * | 5/1915 | Osterholtz | F03B 17/00 60/503 |
| 3,952,517 | A * | 4/1976 | Decker | F03B 17/00 417/337 |
| 3,961,479 | A * | 6/1976 | Anderson | F03B 17/025 60/496 |
| 3,983,702 | A * | 10/1976 | Reid | F03B 13/186 60/501 |
| 4,083,186 | A * | 4/1978 | Jackson, Sr. | F03B 13/187 60/486 |

(Continued)

FOREIGN PATENT DOCUMENTS

| | | | |
|---|---|---|---|
| CN | 113187651 A | * | 7/2021 |
| DE | 2422855 A1 | * | 11/1975 |

(Continued)

OTHER PUBLICATIONS

Japanese decision to grant a patent dated Jun. 13, 2023.
Japanese Notice of Reasons for Refusal dated Mar. 14, 2023.
Japanese Notice of Reasons for Refusal dated Dec. 21, 2022.

*Primary Examiner* — Mark A Laurenzi
*Assistant Examiner* — Xiaoting Hu
(74) *Attorney, Agent, or Firm* — Yokoi & Co., U.S.A.; Toshiyuki Yokoi (57) ABSTRACT

Provided with a power generator and a power generation method capable of generating electricity using water of river or the like with a simple facility without using large facilities required in a conventional hydroelectric power plant.
A buoyancy power generator includes: a storage tank which is capable of storing water; an inlet port from which the water is introduced into the storage tank; an outlet port from which the water is discharged from the storage tank to an outside; an opening and closing mechanism for opening and closing the outlet port; a floating body arranged in the storage tank so as to be vertically movable; and a power generator configured to convert a vertical motion of the floating body into electricity. A buoyancy power generation method using the above described power generator.

8 Claims, 5 Drawing Sheets

(56) References Cited

U.S. PATENT DOCUMENTS

| | | | | |
|---|---|---|---|---|
| 4,309,154 A * | 1/1982 | Daddario | ................ | F03B 17/00 |
| | | | | 417/337 |
| 4,472,937 A * | 9/1984 | Isamu | ................... | F03B 17/025 |
| | | | | 60/507 |
| 4,586,333 A * | 5/1986 | Reid | ..................... | F03B 13/185 |
| | | | | 60/506 |
| 4,599,857 A * | 7/1986 | Kim | ......................... | F03G 3/00 |
| | | | | 417/337 |
| 4,674,281 A * | 6/1987 | Kim | ......................... | F03G 7/10 |
| | | | | 60/496 |
| 4,691,514 A * | 9/1987 | Smith | ................... | F03B 17/025 |
| | | | | 60/506 |
| 4,739,182 A * | 4/1988 | Kenderi | ............. | F03B 13/1855 |
| | | | | 60/398 |
| 4,838,025 A * | 6/1989 | Nelis | ..................... | F03B 17/025 |
| | | | | 60/507 |
| 2005/0079015 A1* | 4/2005 | Beaston | ................ | F03B 17/025 |
| | | | | 405/72 |
| 2021/0071633 A1* | 3/2021 | Tateoka | ................ | F03B 17/025 |

FOREIGN PATENT DOCUMENTS

| | | | | |
|---|---|---|---|---|
| DE | 10230826 A1 * | 2/2004 | ............ | F03B 17/025 |
| FR | 2968723 A1 * | 6/2012 | ............ | F03B 17/025 |
| GB | 2145164 A * | 3/1985 | ............ | F03B 17/025 |
| GB | 2259117 A * | 3/1993 | ............ | F03B 17/025 |
| JP | S54-086036 A | 7/1979 | | |
| JP | S54-86036 A | 7/1979 | | |
| JP | 2020-142226 A | 9/2020 | | |
| KR | 2008-0092505 A | 10/2008 | | |
| WO | 2007/004290 A | 1/2007 | | |
| WO | WO-2007004290 A1 * | 1/2007 | ............. | F03B 17/04 |
| WO | 2013/044553 A | 4/2013 | | |
| WO | WO-2013044553 A1 * | 4/2013 | ............ | F03B 17/025 |

* cited by examiner

Fig. 4

BUOYANCY POWER GENERATOR AND BUOYANCY POWER GENERATION METHOD

CROSS-REFERENCES TO RELATED APPLICATIONS

This patent specification is based on Japanese utility model application, No. 2022-164462 filed on Oct. 13, 2022 in the Japan Patent Office, the entire contents of which are incorporated by reference herein.

BACKGROUND OF THE INVENTION

1. Field of the Invention

The present invention relates to a buoyancy power generator and a buoyancy power generation method.

2. Description of the Related Art

Hydroelectric power generation is conventionally used for generating electricity by rotating hydraulic turbines using the water flow of river and the like.

In order to generate relatively large amount of electricity, a large facility such as a dam shown in Non-patent Document 1 is constructed.

Non-Patent Document 1 https://www.tepco.co.jp/rp/business/hydroelectricpower/mechanism/BRIEF

SUMMARY OF THE INVENTION

When the hydraulic turbines are rotated, it is difficult to convert all of the water flow into the rotational energy of the hydraulic turbines without any waste. Furthermore, when the dam is constructed, the location of constructing the dam is limited since the large facility should be constructed while ensuring large height difference.

The present invention provides a buoyancy power generator and a buoyancy power generation method capable of efficiently generating relatively large electricity while reducing the limitation of the location of constructing the facility compared to the dam and the like.

The present invention provides a buoyancy power generator, including: a storage tank which is capable of storing water; an inlet port from which the water is introduced into the storage tank; an outlet port from which the water is discharged from the storage tank to an outside; an opening and closing mechanism for opening and closing the outlet port; a floating body arranged in the storage tank so as to be vertically movable; and a power generator configured to convert a vertical motion of the floating body into electricity.

In the buoyancy power generator configured as described above, the water is introduced from the inlet port into the storage tank in a state that the floating body is arranged in the storage tank so as to be vertically movable. As the water is stored in the storage tank, the water level in the storage tank rises and the floating body is moved upward by the buoyancy of the water. When the water in the storage tank is increased to a predetermined amount, the opening and closing mechanism of the outlet port is opened to discharge the water from the outlet port to the outside. As the water in the storage tank is discharged to the outside, the water level in the storage tank descends and the floating body is moved downward by the gravity of the floating body. When the water in the storage tank is decreased to a predetermined amount, the opening and closing mechanism of the outlet port is closed. Consequently, the water level in the storage tank rises again and the floating body is moved upward. The above described vertical motion of the floating body is converted into the electricity using the power generator.

In the above described configuration, it is possible that the outlet port is provided at a position lower than the inlet port.

In the buoyancy power generator configured as described above, since the outlet port is provided at a position lower than the inlet port, the water flow is formed from the inlet port to the outlet port by the gravity when the opening and closing mechanism of the outlet port is opened.

In the above described configuration, it is possible that the opening and closing mechanism is configured to repeat an opening and closing operation of the outlet port at a predetermined cycle.

In the buoyancy power generator configured as described above, the opening and closing operation of the outlet port is repeated by the opening and closing mechanism at a predetermined cycle. Namely, the power generation is continued by repeating the vertical motion of the floating body continuously at a predetermined cycle.

In the above described configuration, it is possible that the opening and closing mechanism is configured to switch an opening and a closing of the outlet port by rotating an impervious wall in a horizontal direction.

In the buoyancy power generator configured as described above, since the rotation direction of the impervious wall is the horizontal direction, the load of opening and closing the outlet port is minimized.

In the above described configuration, it is possible that the power generator is configured to convert the vertical motion of the floating body into the electricity using a rack and pinion gear.

In the buoyancy power generator configured as described above, the vertical motion of the floating body is converted into a rotary motion by the rack and pinion gear and the rotary motion is converted into the electrical energy by the power generator.

In the above described configuration, it is possible that the floating body is formed by a fiber-reinforced plastic and a cavity is formed inside the floating body.

In the buoyancy power generator configured as described above, since the floating body is formed by a fiber-reinforced plastic and a cavity is formed inside the floating body, the durability of the floating body is secured while reducing the weight. In addition, the gravity is secured sufficiently when the floating body is moved downward.

In the above described configuration, it is possible that a guide wall is provided between the inlet port and the floating body and another guide wall is provided between the outlet port and the floating body for guiding the water below the guide wall and the another guide wall.

In the buoyancy power generator configured as described above, a passage between the inlet port and the floating body and a passage between the outlet port and the floating body are partly interrupted by the guide walls. Since the water is guided downward, the water flow is prevented from affecting the floating body directly.

It is also possible to use the buoyancy power generator as a buoyancy power generation method.

In the present invention, the floating body is moved in the vertical motion by the water stored in the storage tank without directly rotating the hydraulic turbines by the water flow. Thus, the electricity can be generated while using the energy of the water efficiently. Furthermore, even when a relatively large facility is constructed at the location where a large amount of water flow is estimated, the limitation of the location of constructing the facility is relatively small.

DETAILED DESCRIPTION OF THE INVENTION

Figure 1:
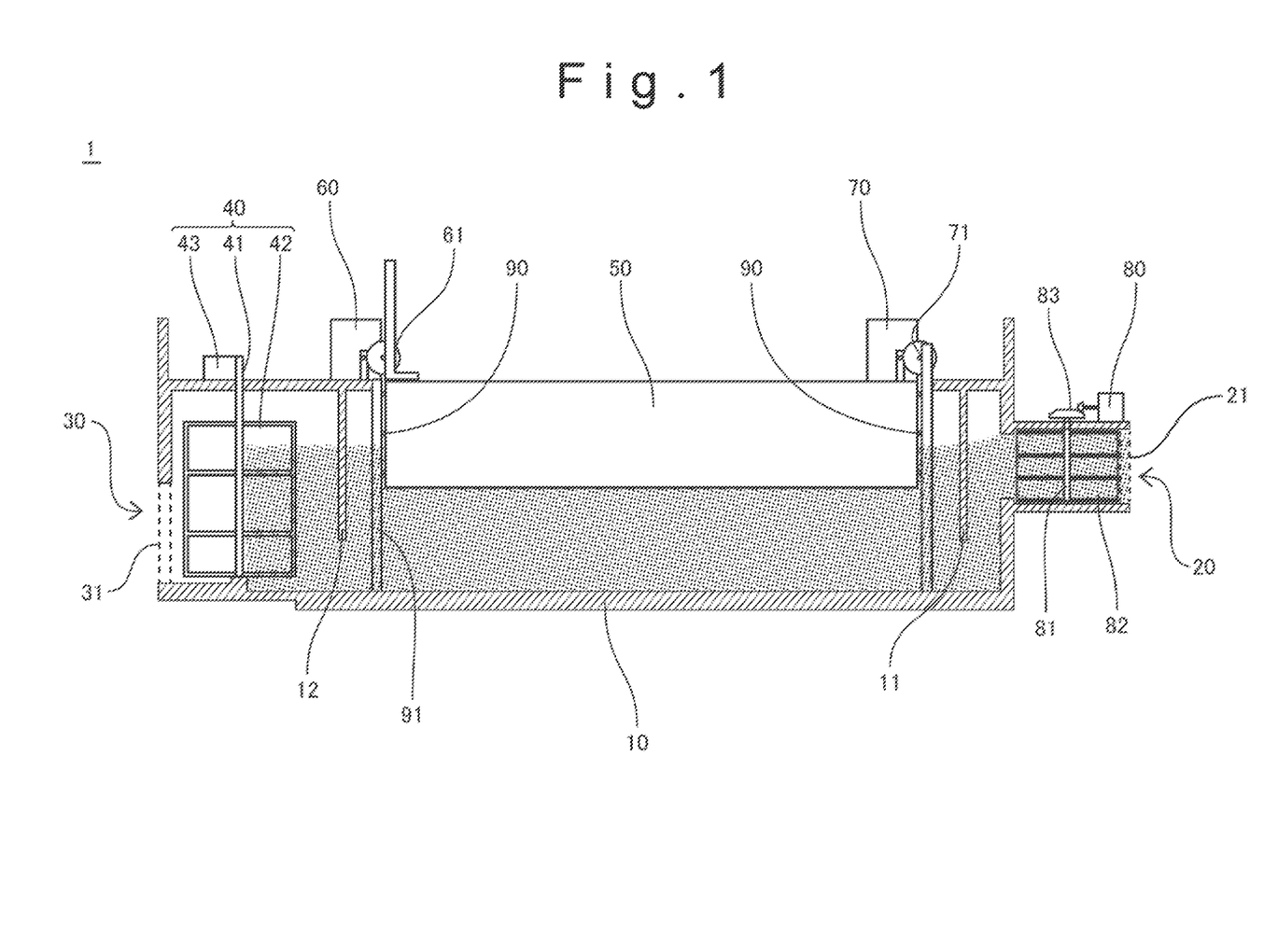
FIG. 1 is a partial cross-sectional view showing an entire configuration of a buoyancy power generator of the present invention.
Figure 2:
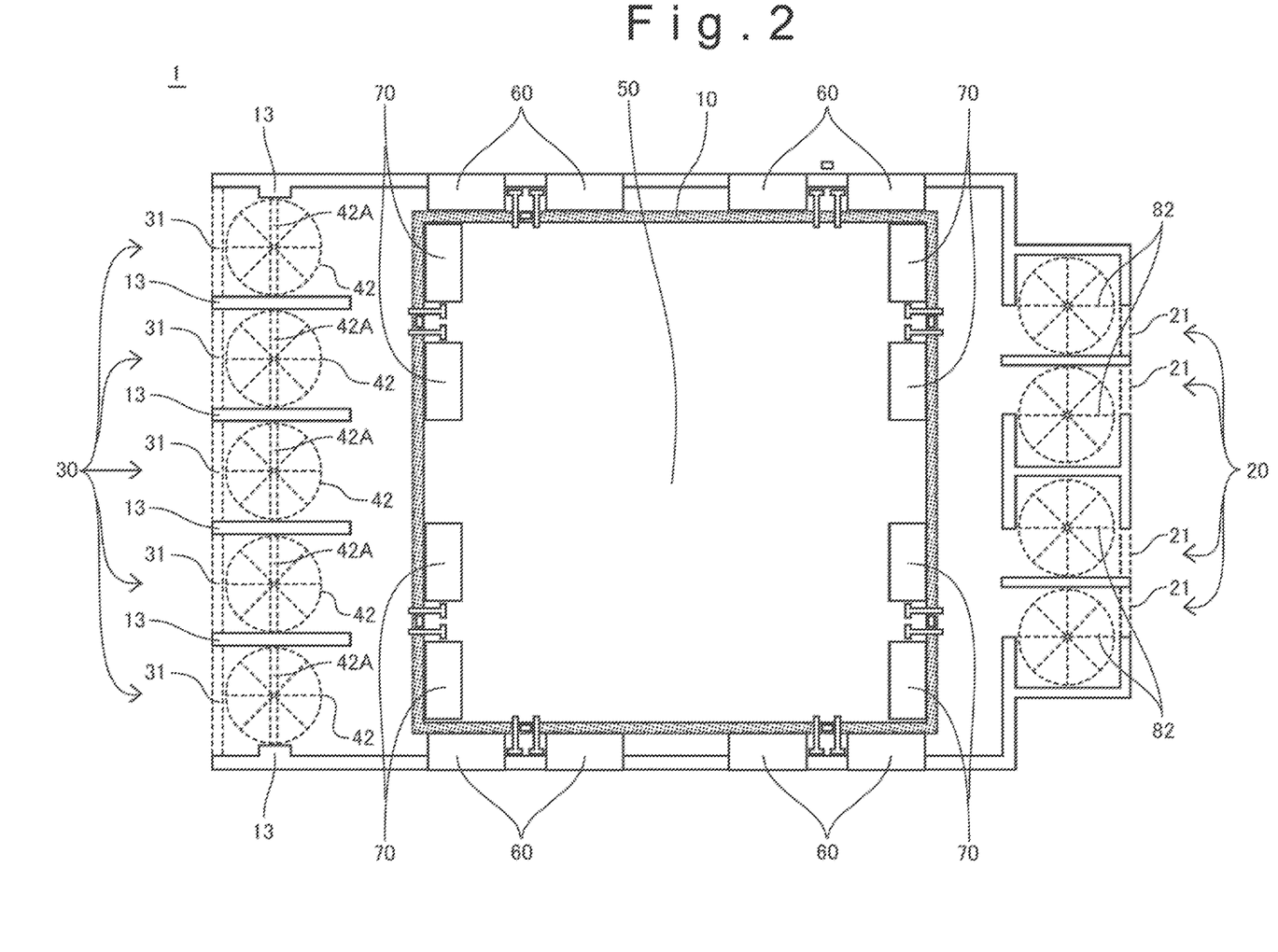
FIG. 2 is a plan view showing an entire configuration of the buoyancy power generator.

Hereafter, embodiments of the present invention will be explained with reference to the drawings shown as an example. FIG. 1 is a partial cross-sectional view showing an entire configuration of a buoyancy power generator 1 of the present invention. In FIG. 1, a storage tank 10 is shown by cross-section and the arrangement of the other components is schematically shown. FIG. 2 is a plan view showing an entire configuration of the buoyancy power generator 1. The buoyancy power generator 1 of the present invention is the device for generating electricity using water of river and the like. Different from the dam in the conventional hydroelectric power generation, there is no need to provide a large height difference. The buoyancy power generator 1 can be installed if the height difference of approximately 2 to 3 m is ensured. For example, it is a matter of course that the buoyancy power generator 1 can be installed on the river flowing at a certain flow speed with a certain water amount. It is also possible to use a sluice or the like installed for introducing the water of the river into the farmland as agricultural water.

As shown in FIG. 1, the buoyancy power generator 1 includes: a storage tank 10 which is capable of storing water; an inlet port (water introducing port) 20 from which the water is introduced from an outside into the storage tank 10; an outlet port (water discharging port) 30 from which the water is discharged from the storage tank 10 to the outside; an opening and closing mechanism 40 for opening and closing the outlet port 30; a floating body 50 arranged in the storage tank 10; and power generators 60, 70 and 80 for generating electricity as a main configuration.

The storage tank 10 is a container formed of concrete or the like for storing the water in the storage tank 10. In the present embodiment, the inner width of the storage tank 10 is 55 m, the inner length of the storage tank is 40 meters and the depth from the bottom surface of the storage tank is 5.6 meters. A center portion of the storage tank 10 is opened upward in a rectangular shape so that the floating body 50 is arranged in the storage tank 10. The outlet port 30 is provided at a position lower than the inlet port 20. In the present embodiment, the level difference between the bottom surface of the inlet port 20 and the bottom surface of the outlet port 30 is 2.5 meters. Since the level difference is provided, the water flows from the inlet port 20 to the outlet port 30 without using a pump or the like in a state that both the inlet port 20 and the outlet port 30 are opened. Note that halftone dots indicate the water in the drawings.

A guide wall 11 extended downward from above is formed between the inlet port 20 and the floating body 50. The guide wall 11 closes the upper part of the storage tank 10 in the width direction to form a flow passage of the water at the lower part of the storage tank 10. Consequently, the water introduced from the inlet port 20 to the storage tank 10 is guided below the floating body 50 by the guide wall 11. A guide wall 12 extended downward from above is also formed between the floating body 50 and the outlet port 30. The guide wall 12 closes the upper part of the storage tank 10 in the width direction to form a flow passage of the water at the lower part of the storage tank 10. The water introduced to the storage tank 10 passes below the storage tank 10 by the guide wall 11 and is discharged to the outside.

The floating body 50 is arranged so as to be vertically movable with respect to the storage tank 10. The floating body 50 is formed by a fiber-reinforced plastic or a steel and a cavity is formed inside the floating body 50. Since the cavity is formed inside, the density of the floating body 50 is approximately same as the density of the water. Thus, it is possible to achieve the structure where the floating body 50 floats on the water. When the water amount in the storage tank 10 increases and the water surface rises, the floating body 50 is moved upward by the buoyancy of the floating body 50 with respect to the water. When the water amount in the storage tank 10 decreases and the water surface descends, the floating body 50 is moved downward by the gravity. In the present embodiment, the floating body 50 has a cubic shape. The floating body 50 is 50 meters long and 35 meters wide in a plan view. The height is 2.7 meters.

An opening and closing mechanism 21 is provided on the inlet port 20 to close the inlet port 20 during maintenance of the buoyancy power generator 1 or when the water increases than usual. The opening and closing mechanism 21 is always open during generation of the electricity. Thus, a constant amount of water is always introduced from the inlet port 20 to the storage tank 10. A power generator 80 is provided on the inlet port 20 as an auxiliary power generator. The power generator 80 is a device for generating electricity by generating the rotary motion by the water flow without using buoyancy. A rotation mechanism is arranged on each of a plurality of inlet ports 20 in a state that a rotation axis 81 is arranged in a vertical direction. Each rotation mechanisms has eight rotor blades 82 arranged at 45° intervals around the rotation axis 81. The water introduced into the inlet port 20 presses the rotor blades 82 in the horizontal direction. Thus, the rotor blades 82 are horizontally rotated around the rotation axis 81. A bevel gear 83 is provided on an upper end of the rotation axis 81. The bevel gear 83 converts the rotary motion of the rotation axis 81 arranged in the vertical direction into the rotary motion of the horizontal rotation axis. The above described rotary motion is transmitted to an input shaft of the power generator 80. The power generator 80 converts the rotary motion into the electrical energy. Since the structure of the power generator 80 is same as the structure of the general power generator for converting the rotary motion into the electrical energy, the detailed explanation will be omitted.

The outlet port 30 is divided into a plurality of outlet ports. Each of a plurality of outlet ports 30 is provided with an opening and closing mechanism 31 for closing the outlet ports 30 during maintenance of the buoyancy power generator 1 or when the water increases than usual. The opening and closing mechanism 31 is always open during generation of the electricity. In addition, an opening and closing mechanism 40 is provided on each of a plurality of outlet ports 30. The opening and closing mechanism 40 is formed by a rotation axis 41, a rotation mechanism 42 and a motor 43. The rotation axis 41 is arranged in the vertical direction and the rotation mechanism 42 is horizontally rotated around the rotation axis 41. As shown in FIG. 2, the rotation mechanism 42 has a circular outer shape as seen from above. An impervious wall 42A is formed at the position corresponding to the center line of the circular rotation mechanism 42. Namely, the impervious wall 42A is formed to pass through the position of a central axis 41 and cross the rotation mechanism 42. A vertical wall 13 of the storage tank 10 is provided on left and right sides of the rotation mechanism 42. When the impervious wall 42A is stopped at the rotation position (position shown in FIG. 2) perpendicular to the water flow, the outlet port 30 is closed by the vertical wall 13 and the impervious wall 42A (closed state). When the impervious wall 42A is located at the position other than the above described position, the water is discharged to the outside from the outlet port 30 (opened state). When the wall surface of the impervious wall 42A is stopped at the position in parallel with the water flow, the friction of the wall surface is the minimum and the flow rate discharged from the outlet port 30 is maximum.

The operation of the motor 43 is controlled to determine the rotation position of the opening and closing mechanism 40 (i.e., impervious wall 42A) and switch the opening and closing of the outlet port 30. First, the impervious wall 42A is arranged in the closed state where the impervious wall 42A is stopped at the position perpendicular to the water flow to close the outlet port 30 and raise the water level of the storage tank 10. When the water level rises to a predetermined height in the storage tank 10, the rotation mechanism 42 is rotated and stopped at the opened state where the rotation mechanism 42 is in parallel with the water flow. Consequently, the water level in the storage tank 10 begins to lower. When the water level in the storage tank 10 descends to a predetermined height, the rotation mechanism is rotated and stopped at the closed state where the rotation mechanism 42 is perpendicular to the water flow. The outlet port 30 is provided at a position lower than the inlet port 20 and the opening area of the outlet port 30 is sufficiently larger than the opening area of the inlet port 20. The opening and closing of the outlet port 30 is repeated at a predetermined cycle by the opening and closing mechanism 40 while the inlet port 20 is always kept open. Thus, the water level in the storage tank 10 can be repeatedly raised and lowered at a predetermined cycle. It is possible to drive the motor 43 by using the electric power generated by the power generator 80 provided on the inlet port 20.

In the present embodiment, it is assumed that the width is 55 meters, the length is 40 meters, and the water level in the storage tank 10 is repeatedly raised and lowered at the level difference of 2.2 meters. In the above described assumption, the volume of the water required for raising the water level in the storage tank 10 by 2.2 meters is 55×40×2.2=4840 m³. When it is assumed that the flow speed of the water is 1 m/s and the water level is raised 2.2 meters in 60 seconds, the required opening area of the inlet port 20 is 4840/60=80.7 m². For example, it is assumed that the inlet port 20 having the width of 45 meters and the height of 1.8 meters, the opening area of 45×1.8=81 m² can be ensured.

It is considered that the raised water level in the storage tank 10 is lowered to the original water level in 60 seconds. In addition to the water increased when the water level is raised in 60 seconds, the water introduced when the water level is lowered in 60 seconds should be also discharged. Therefore, the volume of the water to be discharged is 4840×2=9680 m³. The opening area of the outlet port 30 required for discharging the above described water in 60 seconds is 9680/60=161.3 m². For example, when 16 outlet ports 30 having the width of 3 meters and the height of 3.4 meters are installed, the opening area of 3×10×16=163.2 m² can be ensured. Note that the above described calculations of the increase/decrease amount of the water and the opening area are merely examples. It is possible to optimally specifying the opening area of the inlet port 20, the opening area of the outlet port 30, the opening/closing timing of the opening and closing mechanism 40 and the like in accordance with the flow speed of the water and other conditions.

Rack and pinion gears 61, 71 are provided between the floating body 50 and power generators 60, 70. The vertical motion of the floating body 50 is converted into the rotary motion by the rack and pinion gears 61, 71. Thus, the power generators 60, 70 convert the kinetic energy into the electrical energy. The power generator 60 shows an example where the rack is fixed to the floating body 50 and the rack is vertically moved together with the floating body 50. The power generator 70 shows an example where the rack is fixed to the storage tank 10 and the pinion is vertically moved together with the floating body 50. In the case where the rack is fixed to the storage tank 10, rollers 90 are provided between the floating body 50 and the rack for smoothly moving the floating body 50 in the vertical motion. In the case where the rack is fixed to the floating body 50, a guide 91 is fixed to the storage tank 10 and rollers 90 are provided between the floating body 50 and the guide 91 for smoothly moving the floating body 50 in the vertical motion.

Figure 3:
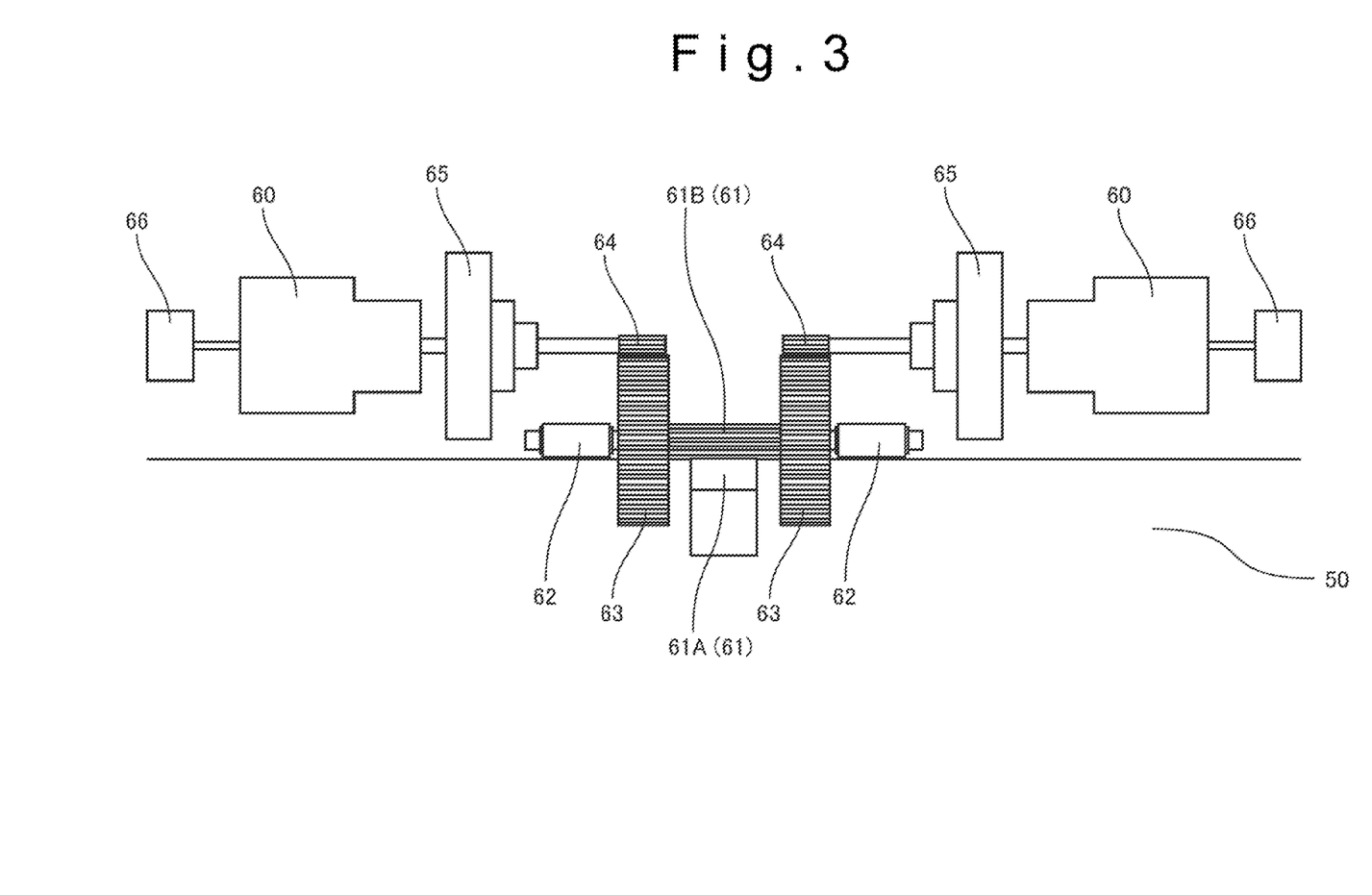
FIG. 3 is a plan view showing a configuration for transmitting a vertical motion of a floating body to a power generator where a rack is fixed to the floating body.

FIG. 3 is a plan view schematically showing a configuration for transmitting the vertical motion of the floating body 50 to the power generator 60. The rack and pinion gear 61 is formed by using a rack 61A and a pinion 61B. The rack 61A includes a shaft formed in a flat-plate shape and gears are formed on the shaft. The pinion 61B includes a plate firmed in a disc-shape and gears are formed on the plate. In the power generator 60, the rack 61A is fixed to the floating body 50 and the pinion 61B is arranged on the storage tank 10 via an attachment portion 62 so that the pinion 61B is rotatable. Two large diameter gears 63 are formed on both ends of the pinion 61B. The large diameter gears 63 are coaxially arranged with the pinion 61B and integrally rotated with the pinion 61B. The outer diameter of the large diameter gears 63 is larger than that of the pinion 61B and the number of teeth of the large diameter gears 63 is larger than that of the pinion 61B. The two large diameter gears 63 are engaged respectively with small diameter gears 64 formed on the input shaft of the power generator 60. The output shaft of the small diameter gears 64 is connected with the power generator 60 via a speed increasing mechanism 65. The power generator 60 is connected with a control board 66 for controlling the power generator 60.

In the power generator 60 having the configuration described above, when the floating body 50 is moved in the vertical direction in accordance with the increase/decrease of the water level of the storage tank 10, the rack 61A is moved together with the floating body 50 in the vertical direction. In accordance with the linear motion of the rack 61A in the vertical direction, the pinion 61B engaged with the rack 61A performs the rotary motion. In addition, the two large diameter gears 63 coaxially formed with the pinion 61B perform the rotary motion together with the pinion 61B. The small diameter gears 64 engaged with the large diameter gears 63 perform the rotary motion while being accelerated.

The rotary motion of the small diameter gears 64 is further accelerated by the speed increasing mechanism 65 and transmitted to the power generator 60. The power generator 60 converts the above described rotary motion into the electrical energy. The control board 66 manages the power generation amount and protects the power generator 60, for example. The explanation of the structure of the power generator 60 is omitted since it is similar to the structure of the general power generator for converting the rotary motion into the electrical energy. It is possible to generate the electricity also when the floating body 50 descends in addition to when the floating body 50 rises by providing a switching mechanism or the like on the power generator 60.

Figure 4:
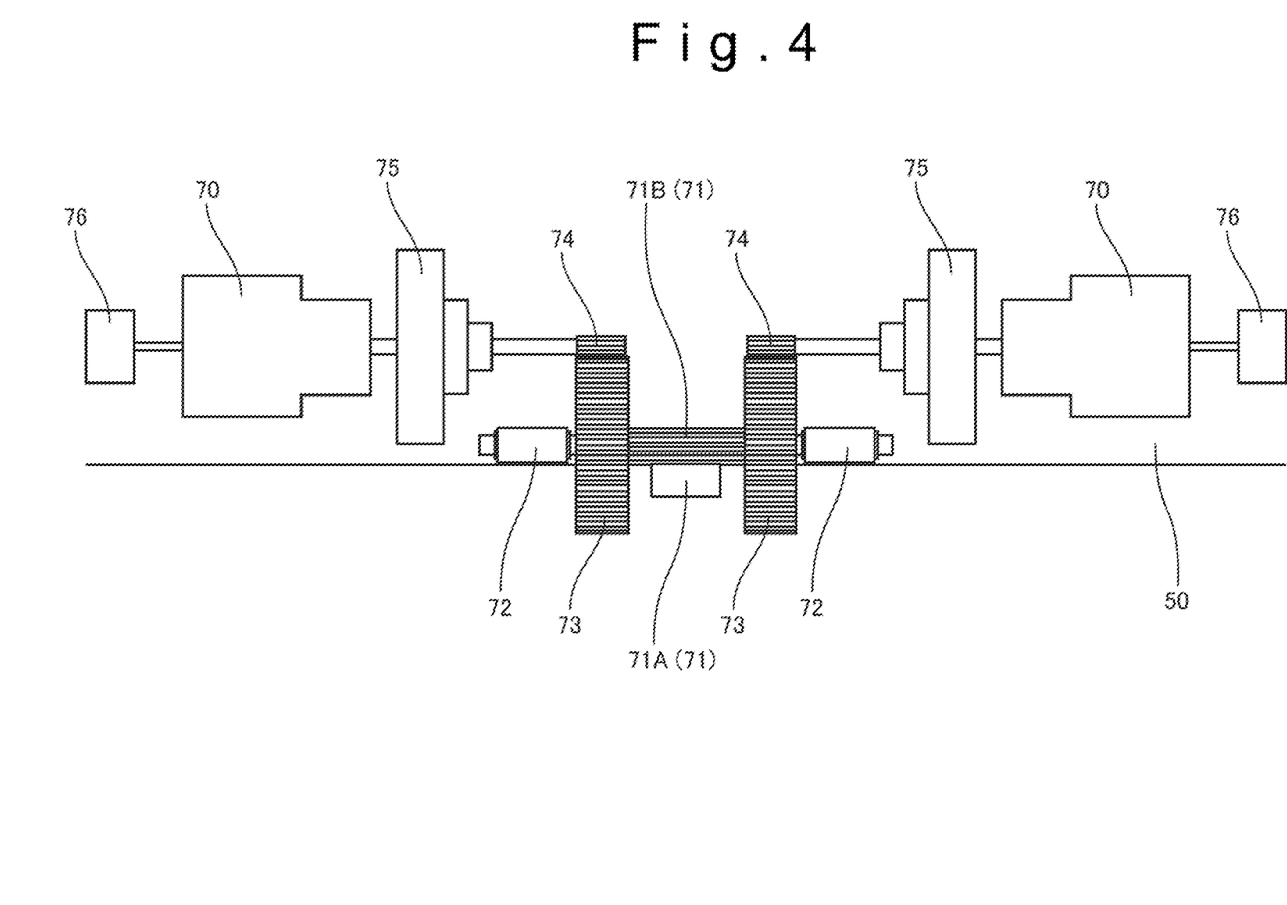
FIG. 4 is a plan view showing a configuration for transmitting a vertical motion of floating body to the power generator where a rack is fixed to a storage tank.

FIG. 4 is a plan view showing a configuration for transmitting the vertical motion of the floating body 50 to the power generator 70. A rack and pinion gear 71 is formed by a rack 71A and a pinion 71B. The rack 71A includes a shaft formed in a flat-plate shape and gears are formed on the shaft. The pinion 71B includes a plate firmed in a disc-shape and gears are formed on the plate. In the power generator 70, the rack 71A is fixed to the storage tank 10 and the pinion 71B is arranged on the floating body 50 via an attachment portion 72 so that the pinion 71B is rotatable. Two large diameter gears 73 are formed on both ends of the pinion 71B. The large diameter gears 73 are coaxially arranged with the pinion 71B and integrally rotated with the pinion 71B. The outer diameter of the large diameter gears 73 is larger than that of the pinion 71B and the number of teeth of the large diameter gears 73 is larger than that of the pinion 71B. The two large diameter gears 73 are engaged respectively with small diameter gears 74 formed on the input shaft of the power generator 70. The output shaft of the small diameter gears 74 is connected with the power generator 70 via a speed increasing mechanism 75. The power generator 70 is connected with a control board 76 for controlling the power generator 70.

In the power generator 70 having the configuration described above, when the floating body 50 is moved in the vertical direction in accordance with the increase/decrease of the water level of the storage tank 10, the pinion 71B arranged on the floating body 50 is rotated while being engaged with the rack 71A. Consequently, the floating body 50 is moved together with the pinion 71B in the vertical direction along the rack 71A. In accordance with the rotation of the pinion 71B, the two large diameter gears 73 coaxially formed with the pinion 71B perform the rotary motion together with the pinion 71B. The small diameter gears 74 engaged with the large diameter gears 73 perform the rotary motion while being accelerated. The rotary motion of the small diameter gears 74 is further accelerated by the speed increasing mechanism 75 and transmitted to the power generator 70. The power generator 70 converts the above described rotary motion into the electrical energy. The control board 76 manages the power generation amount and protects the power generator 70, for example. The explanation of the structure of the power generator 70 is omitted since it is similar to the structure of the general power generator for converting the rotary motion into the electrical energy. It is possible to generate the electricity also when the floating body 50 descends in addition to when the floating body 50 rises by providing a switching mechanism or the like on the power generator 70.

Figure 5:
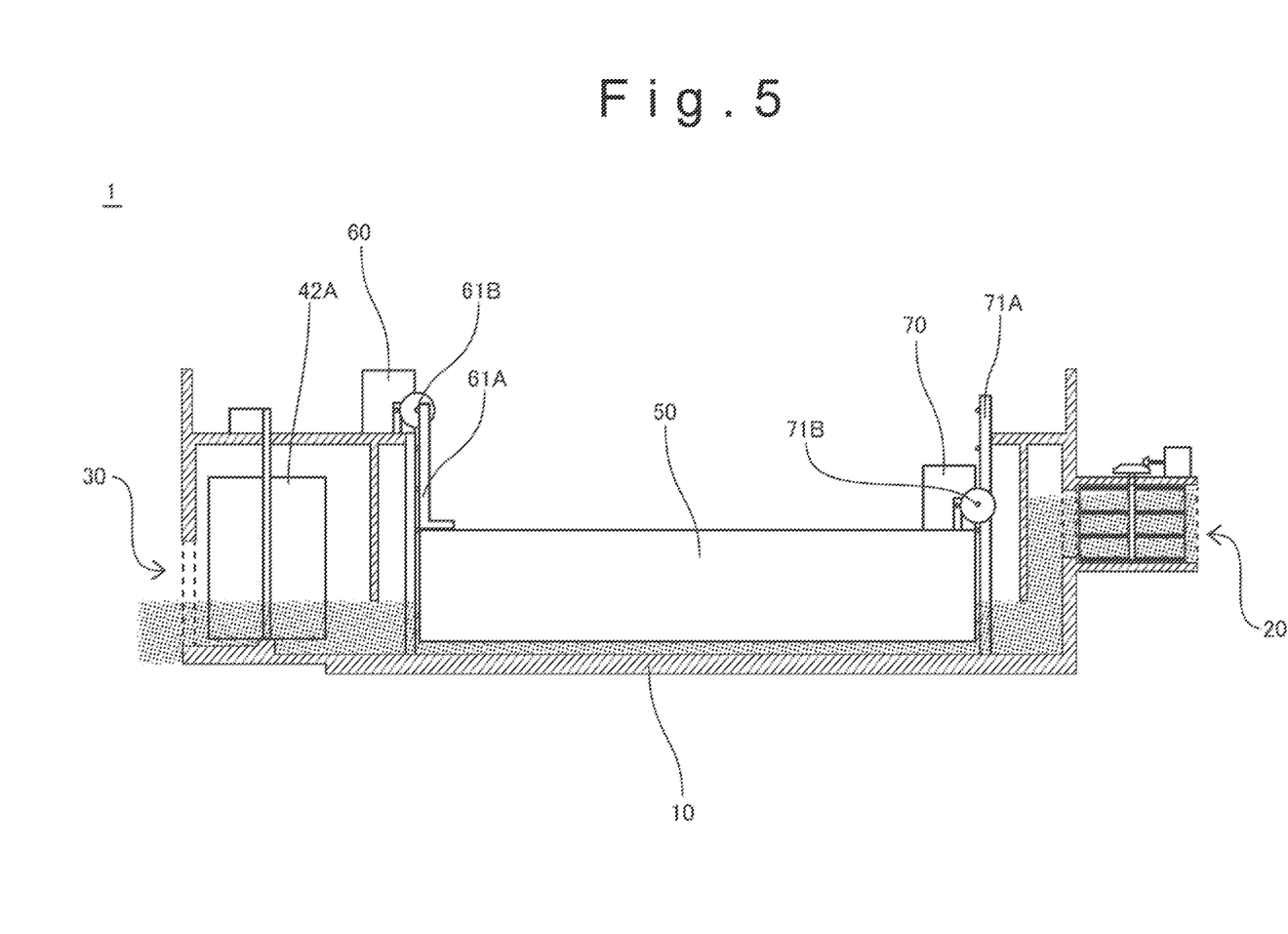
FIG. 5 is a partial cross-sectional view of the buoyancy power generator showing a state that water level is lowered.

FIG. 5 is a partial cross-sectional view of the buoyancy power generator 1 showing a state that water level is lowered. The storage tank 10 is shown by cross-section and the arrangement of the other components is schematically shown. In FIG. 5, the impervious wall 42A of the opening and closing mechanism 40 is arranged in parallel with the water flow to open the outlet port 30. Since the water amount discharged from the outlet port 30 is larger than the water amount introduced from the inlet port 20 into the storage tank, the water level of the storage tank 10 descends. In accordance with the descent of the water level, the floating body 50 is moved downward. In the power generator 60, the rack 61A is moved downward integrally with the floating body 50. On the other hand, in the power generator 70, the pinion 71B is moved downward integrally with the floating body 50 with respect to the rack 71A fixed to the storage tank 10. Note that the water level can be further lowered from the state shown in FIG. 5.

In the buoyancy power generator configured as described above, the water level in the storage tank can be changed only by opening and closing the opening and closing mechanism of the outlet port while the inlet port is always open. Consequently, the floating body arranged in the storage tank can be vertically moved, the vertical motion of the floating body can be converted into the rotary motion and the rotary motion can be converted into the electrical energy by the power generator. Since the outlet port is provided at the position lower than the inlet port, the water can be flown from the inlet port to the outlet port without using the power source such as a pump. Although the height difference is provided from the inlet port to the outlet port for forming the water flow, a large height difference is not required different from the conventional hydroelectric power generation. Since the water introduced from the inlet port is discharged from the outlet port, it is possible to install the buoyancy power generator of the present invention in the middle of the path of the existing agricultural water. The vertical motion of the floating body can be continuously repeated by repeating the opening and closing of the outlet port by the opening and closing mechanism at a predetermined cycle. Namely, the electricity can be generated continuously. In the opening and closing mechanism, since the impervious wall is rotated in the horizontal direction, the load of opening and closing the outlet port is minimized. Since the rack and pinion gear is used, the vertical motion of the floating body can be efficiently converted into the rotary motion and transmitted to the power generator. Since the floating body is formed by a fiber-reinforced plastic or a steel and a cavity is formed inside the floating body, enough buoyancy can be obtained while securing the durability of the floating body. Since the guide walls are provided between the inlet port and the floating body and between the outlet port and the floating body for guiding the water downward, a passage between the inlet port and the floating body and a passage between the outlet port and the floating body are partly interrupted. Consequently, the horizontal water flow introduced from the inlet port is prevented from directly affecting the floating body. In addition, the horizontal water flow discharged from the outlet port to the outside is prevented from directly affecting the floating body.

The buoyancy generated by the upward motion of the floating body 50 will be roughly calculated. A bottom area S of the floating body is 35 meters×50 meters. A height H of the floating body sunk in the water is 2.2 meters. A density ρ of the water is 997 kg/m 3, an acceleration g of gravity is 9.81. In the above described case, a buoyancy F can be calculated as shown below.

$$F = S \times H \times \rho \times g = 35 \times 50 \times 2.2 \times 997 \times 9.81 \approx 37655 \, kN$$

Here, when a moving distance L of the water level in the vertical direction is 2.2 meters, an energy U increased by the buoyancy can be calculated as shown below.

$$U = F \times L = 37655 \times 2.2 \approx 82841 \, kJ$$

When the pinion moves the floating body 50 is raised by the pinion in 60 seconds, the work per second (i.e., power P) of the rising floating body 50 can be calculated as shown below.

$$P = U/60 \approx 1380 \, kW$$

The power generated by the buoyancy is converted into the rotary motion by the rack and pinion gears 61, 71 and the rotary motion is accelerated by speed increasing mechanisms 65, 75 and transmitted to the power generators 60, 70. The power generators 60, 70 convert the accelerated rotary motion into the electrical energy. It is assumed that the cycle of raising the floating body 50 in 60 seconds and lowering the floating body 50 in 60 seconds is repeated. If it is assumed that equivalent work can be obtained by the gravity when the floating body 50 is lowered similar to the situation when the floating body 50 is raised, the electric power obtained by the vertical motion of the floating body 50 is 1380×24=33120 kWh in 24 hours and 120888000 kWh (≈12 GWh) in 365 days. Although the above described calculation of the output and electric power is merely outline, the output and the electric power can be further increased by changing the volume of the floating body 50, the rising time, the flow speed of water, the timing of the vertical motion and the like.

The size of the storage tank 10, the floating body 50 and the like described in the above embodiments are merely examples. The same can be said for the height of the floating body 50 sunk in the water when the water level is raised. These are not limited to the examples shown in the above described embodiment. These can be arbitrarily specified in accordance with various conditions such as the place of installing the buoyancy power generator and the required output. The shape and the like of the storage tank 10 can be also arbitrarily specified. For example, it is possible to form the storage tank without providing the guide walls 11, 12 and it is also possible to form the storage tank further adding the guide wall.

The number and the size of the inlet ports 20, the number and the size of the outlet ports 30 and the height difference between the inlet port 20 and the outlet port 30 are merely examples. These are not limited to the examples shown in the above described embodiment. These can be arbitrarily specified in accordance with various conditions such as the place of installing the buoyancy power generator and the required output. Considering the load when opening and closing the opening and closing mechanism, it is preferred to provide a plurality of inlet ports and a plurality of outlet ports. It is also possible to arbitrarily specify the depth of the floating body sunk in the water.

In the above described embodiment, in the opening and closing mechanism 40 of the outlet port 30, the impervious wall 42A is arranged at the position of the center line of the rotation mechanism 42 having a circular shape. However, the configuration of the opening and closing mechanism is not limited to the above described configuration. Various configurations can be adopted as long as the outlet port 30 can be opened and closed. For example, it is possible to provide an impervious wall covering a part of an arc of the rotation mechanism 42. It is possible to adopt the configuration of opening and closing the output port without rotation.

In the above described embodiment, the number and the arrangement of the power generators are merely examples. It is not necessary to use both the power generator 60 and the power generator 70. It is possible to use only one of the power generator 60 and the power generator 70. It is possible to omit the power generator 80 provided on the inlet port and it is possible to additionally provide the power generator similar to the power generator 80 at the position other than the inlet port.

In the above described embodiment, the upward motion of the floating body 50 is converted into the electricity. However, the present invention is not limited to the above described configuration. In addition to the upward motion, the downward motion of the floating body 50 can be also converted into the electricity by the power generator. When only one of the upward motion and the downward motion is converted into the electricity, it can be said that the vertical motion is converted into electricity.

In the above described embodiment, the floating body 50 is vertically moved in the vertical motion. However, the direction of moving the floating body 50 is not limited to the vertical motion. Even when the floating body 50 is moved in the horizontal direction while moving in the vertical direction, such configuration is included in the present invention as long as the floating body 50 moves upward using the buoyancy.

In the above described embodiment, the vertical motion of the floating body is converted into the rotary motion to generate electricity by using the rack and pinion gear. However, the present invention is not limited to the above described configuration. As long as the vertical motion of the floating body is converted into electricity, such configuration is included in the present invention. Of course, the configuration of converting the vertical motion into the rotary motion and then converting the rotary motion into electricity is included in the configuration of converting the vertical motion of the floating body into electricity.

Although it is to those skilled in the art, the following are disclosed as the one embodiment of this invention.

Mutually substitutable members, configurations, etc. disclosed in the embodiment can be used with their combination altered appropriately.

Although not disclosed in the embodiment, members, configurations, etc. that belong to the known technology and can be substituted with the members, the configurations, etc. disclosed in the embodiment can be appropriately substituted or are used by altering their combination.

Although not disclosed in the embodiment, members, configurations, etc. that those skilled in the art can consider as substitutions of the members, the configurations, etc. disclosed in the embodiment are substituted with the above mentioned appropriately or are used by altering its combination.

DESCRIPTION OF THE REFERENCE NUMERALS

1: buoyancy power generator, 10: storage tank, 11: guide wall, 12: guide wall, 20: inlet port, 21: opening and closing mechanism, 30: outlet port, 31: opening and closing mechanism, 40: opening and closing mechanism, 41: rotation axis, 42: rotation mechanism, 43: motor, 50: floating body, 60: power generator, 61: rack and pinion gear, 70: power generator, 71: rack and pinion gear, 80: power generator, 90: roller, 91: guide

What is claimed is:

1. A buoyancy power generator, comprising:
    a storage tank which is capable of storing water;
    an inlet port from which the water is introduced into the storage tank;

an outlet port from which the water is discharged from the storage tank to an outside;

an opening and closing mechanism for opening and closing the outlet port;

a floating body arranged in the storage tank so as to be vertically movable; and a power generator configured to convert a vertical motion of the floating body into electricity, wherein an area of the outlet port is larger than an area of the inlet port, and the inlet port is always open during generation of the electricity so that a constant amount of water is always introduced from the inlet port to the storage tank.

2. The buoyancy power generator according to claim 1, wherein the outlet port is provided at a position lower than the inlet port.

3. The buoyancy power generator according to claim 1, wherein the opening and closing mechanism is configured to repeat an opening and closing operation of the outlet port at a predetermined cycle.

4. The buoyancy power generator according to claim 1, wherein the opening and closing mechanism is configured to switch an opening and a closing of the outlet port by rotating an impervious wall in a horizontal direction.

5. The buoyancy power generator according to claim 1, wherein the power generator is configured to convert the vertical motion of the floating body into the electricity using a rack and pinion gear.

6. The buoyancy power generator according to claim 1, wherein the floating body is formed by a fiber-reinforced plastic and a cavity is formed inside the floating body.

7. The buoyancy power generator according to claim 1, wherein a guide wall is provided between the inlet port and the floating body and another guide wall is provided between the outlet port and the floating body for guiding the water below the guide wall and the another guide wall.

8. A buoyancy power generation method, comprising:

a step of introducing water from an inlet port to a storage tank which is capable of storing water;

a step of discharging the water from the storage tank to an outside by opening an outlet port which is provided at a position lower than the inlet port by an opening and closing mechanism;

a step of closing the outlet port by the opening and closing mechanism;

a step of vertically moving a floating body arranged in the storage tank so as to be vertically movable; and a step of converting a vertical motion of the floating body into electricity by the power generator, wherein an area of the outlet port is larger than an area of the inlet port, and the inlet port is always open during generation of the electricity so that a constant amount of water is always introduced from the inlet port to the storage tank.

* * * * *